Sept. 4, 1951 G. J. FREDENDALL 2,566,698

MODULATION DISTORTION CORRECTION

Filed Aug. 28, 1947 2 Sheets-Sheet 1

INVENTOR.

GORDON L. FREDENDALL

BY Samuel B. Smith

ATTORNEY

INVENTOR.
GORDON L. FREDENDALL
BY Samuel B. Smith
ATTORNEYS.

Patented Sept. 4, 1951 2,566,698

UNITED STATES PATENT OFFICE 2,566,698

MODULATION DISTORTION CORRECTION

Gordon L. Fredendall, Feasterville, Pa., assignor to Radio Corporation of America, a corporation of Delaware Application August 28, 1947, Serial No. 770,975

2 Claims. (Cl. 178—7.1)

My invention, in general, relates to television apparatus and, more particularly, to apparatus for correcting or compensating for video signal distortions occurring in the generation and reproduction of such video signals.

In some modern television systems, the image to be televised is directed onto a photosensitive surface and the electron emission from the surface is a measure of the optical intensity of elemental areas of the image which is being televised. By appropriate scanning means, the quantity of this photoemission is measured in a line by line manner, thereby to generate video or image signals representative of the image light values along a particular line. In the so-called non-storage type of scansion tube, this is accomplished by moving the electron image, formed by the emission of electrons from the photoemissive area, past a collecting element in such a manner that signals are developed therefrom. In another form of apparatus whose use is wide spread and using what is referred to usually as a storage type of tube, a cathode ray beam moves in a line by line manner over a target electrode where an electrostatic charge image is present to at least partially neutralize the charges. This results in the development of video signals representative of the optical values along successive line elements of the televised image. The signals developed by either of these well known systems are usually good representations of the optical image undergoing scansion. However, these signals must be passed through other apparatus before they are transmitted or radiated to receiving apparatus to reproduce the image.

The signals are usually passed through video signal amplifying apparatus before being supplied to the transmitter, per se, where they are used to amplitude modulate, for example, a carrier wave produced at the transmitter. This modulation, in accordance with well known electrical theory, results in the forming of a main frequency, which corresponds to the carrier frequency, and a band of frequencies on either side thereof which are referred to as side bands. In the case of television transmission, the side bands occupy a prohibitively large portion of the spectrum if both side bands of frequencies are radiated or otherwise transmitted. Accordingly, before transmission, one of the side bands of frequencies may be partially suppressed and, since it is not considered practical to suppress the entire side band, there is transmitted a portion of this partially suppressed side band which then is referred to as a vestigial side band. This is accomplished by passing the modulated fundamental carrier and side bands through a vestigial side band filter and this allows the passage therethrough and transmission thereof of the fundamental along with one complete side band and a portion of the other set of side band frequencies which has been selected for partial suppression.

The foregoing material is well recognized television practice and a fuller discussion thereof, both with regard to the camera apparatus and the vestigial side band transmission, may be found in the book entitled "Television Simplified" by Kiver, 1946 edition, published by D. Van Nostrand, Inc.

However, attenuation in the transmitter portion of the apparatus in which the carrier modulation takes place, and in the vestigial side band filter section, introduces phase distortion in the signal. This can be particularly serious when the camera, in its scanning, scans from a portion which is extremely white to a portion which is extremely black in the image undergoing scansion. Under these circumstances, and with phase distortion, in the image signal reproduced at the receiver there will appear a particularly white streak just ahead of the point of transition into what should be the black section of the image and this is referred to as a leading white.

Additionally, the signal, which was generated in the camera as having a rectangular wave front when going from white to black, is distorted so that the steepness of the wave front is changed. Further, the waveform, instead of being rectangular, will tend to gradually approach a steady value with some signal oscillations near the leading edge and this is referred to in the art as smear.

Accordingly, it may be said that leading white components of the signal are developed by distortion, smear components of the signal are developed, and there is a loss of the high frequency components of the signal resulting in a change in the slope of the video signal wave form.

It is one of the major purposes of the present invention to compensate for and minimize the effect of these undesired distortions.

The compensation could be attempted after the distortions have occurred by introducing apparatus or circuits to act on the envelope of the carrier wave after or before the modulated carrier has been passed through the vestigial side band filter since it is principally in the modulating section and the filter section that the phase distortions occur. It is preferable, however, to introduce corrections or compensations into the video signal itself rather than attempt to compensate after modulation of the carrier has taken place and it is a further purpose of the invention to provide an arrangement in which this is accomplished.

It is a further object of my invention to provide correcting circuits for eliminating and minimizing the aforementioned distortion and which may be used either in conjunction with the transmission apparatus or with receiving and reproducing apparatus.

Other objects and advantages will be apparent from a reading of the hereinafter appended specification and claims.

My invention, in general, in what I consider its preferred embodiment, contemplates the introduction of a counterphase distortion introduced in the signals while the signals are still in what may be termed the video section of the transmitter apparatus. By the video section is meant that section of the transmitter preceding the modulator itself and in which section there appear only the video signals developed by the camera apparatus and none of the fundamental carrier.

There is provided a first circuit which changes the phase of the video signal but which circuit is not concerned with accentuation of any particular frequency or band of frequencies. By means of this circuit, the phase of the video signal from the camera, which would be subjected to distortion in the transmitter and vestigial side band filter to cause a so-called leading white effect, is pre-distorted in an opposite sense to that in which distortion will take place in the transmitter and filter section and when such latter distortion takes place, the signal approaches the characteristic form which was developed within the camera tube. This will be accomplished by the use of circuits utilizing the principles set forth in U. S. Patent No. 2,178,012 granted October 31, 1939, to E. L. C. White.

Further, there is provided a second circuit through which the signal is passed and the latter comprises a circuit having characteristics such that the medium and high video frequencies are accentuated relatively to the lower video frequencies. This results in an adjustment of the so-called smear distortion of the signal so that the smear is minimized as will be seen hereinafter.

A third circuit is provided which pre-distorts the video signal from its normal form by emphasizing and accentuating only the high frequency components of the video signal. It has been brought out hereinbefore that distortion of the signal which normally should be of a nearly rectangular wave form to the extent dictated by the video band width when going abruptly from a white to a black element in the image undergoing scansion, results in the formation of a wave form whose leading edge slopes unduly instead of being nearly rectangular in shape. The circuit which accentuates the high frequencies will correct this distorting influence of the transmitter and vestigial side band filter and the result is that this effect will be minimized.

In an alternative form of my invention, the aforementioned circuits may be included in the video section of the receiver apparatus rather than in the transmitter, but I prefer to include them in the transmitter since it is considered preferable to correct for distortion of a signal before transmission rather than having it corrected by each individual receiver.

My invention will be understood best by reference to the drawings in which.

Figure 1:
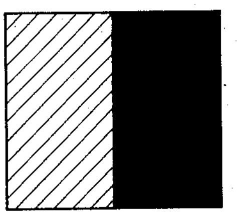
Fig. 1 is an illustration of a portion of an optical image undergoing scansion.

Referring to Fig. 1, there is shown an illustration of what may be a portion of an optical image undergoing scansion by a television camera tube. It will be appreciated that the wave form of the signals developed by linear scansion of this image will be rectangular in nature since the signal will change abruptly from a value representing white to a value representing black. In the ordinary optical image undergoing scansion, the elements of the image do not, in general, have the amount of contrast that is shown in this illustration. However, the same principles will apply when scanning from one element of the ordinary image to the next where there is a difference in the shade. Upon scanning the image in Fig. 1, there will be developed a series of signals each having a rectangular component whose wave front should be very steep.

It has been brought out hereinbefore in this specification that the signals developed by the camera tubes are, in general, accurate representations of the optical image undergoing scansion but that, in the passage of these signals through the modulating section of the transmitter and the vestigial side band filter, phase and amplitude distortion occurs which results in the loss of high frequency components of the signal, in the development of a smear component in the signal, and in the formation of a so-called "leading white" signal.

Figure 2:
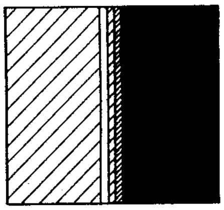
Fig. 2 is an illustration of the reproduction of the image of Fig. 1 by signals which have been distorted.

Referring to Fig. 2, there is shown an illustration of the reproduction of an image by signals developed from the image of Fig. 1 and transmitted with accompanying distortion. The white part of the image of Fig. 1 will be reproduced but there will appear, before the reproduction of the black part of that figure, a white streak which is generally more brilliant than the normal white of the optical image. The signals representative of the optical image itself will then produce a section which is gray and which will gradually increase in shade across the scanning line until the black section of the image is accurately reproduced.

Figure 3:
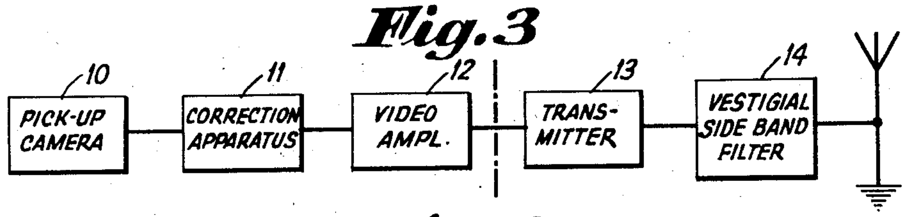
Fig. 3 is a schematic block diagram illustrating one embodiment of my invention.

Referring to Fig. 3, there is shown a block diagram representation of one of the embodiments of my invention. A pick-up camera 10 develops signals representative of the optical values along linear sections of an optical image being televised and these signals normally are reasonably accurate representations thereof. These signals are passed to a correction apparatus 11 which pre-distorts the wave formation so as to compensate for distortions which will occur when the signal is passed to other portions of the apparatus. This apparatus will be described in detail in the description of Fig. 5. The output of the correction circuits 11 then is fed to video amplifier 12.

The elements 10, 11, and 12 may be said to be in the video section of the transmitter, that is to say, in this portion of the apparatus only the video signals occur and none of the carrier is present. The signals are passed from the video amplifiers 12 to the transmitter 13, the latter including means for generating a carrier frequency and amplitude modulating the carrier with the video signals. The so modulated carrier, with its accompanying side bands, is passed through the vestigial side band filter 14 and the output thereof is either radiated or transmitted to reproducing apparatus by well known means.

It is considered preferable to insert the correcting for phase distortion in the video signal itself prior to its impression onto the transmitter since this can be done better than attempting to correct the envelope of the modulated carrier after the phase distortion has taken place. The correction may be determined mathematically or it may be determined by monitoring and adjusting the correction apparatus for optimum results.

Figures 4, 5:
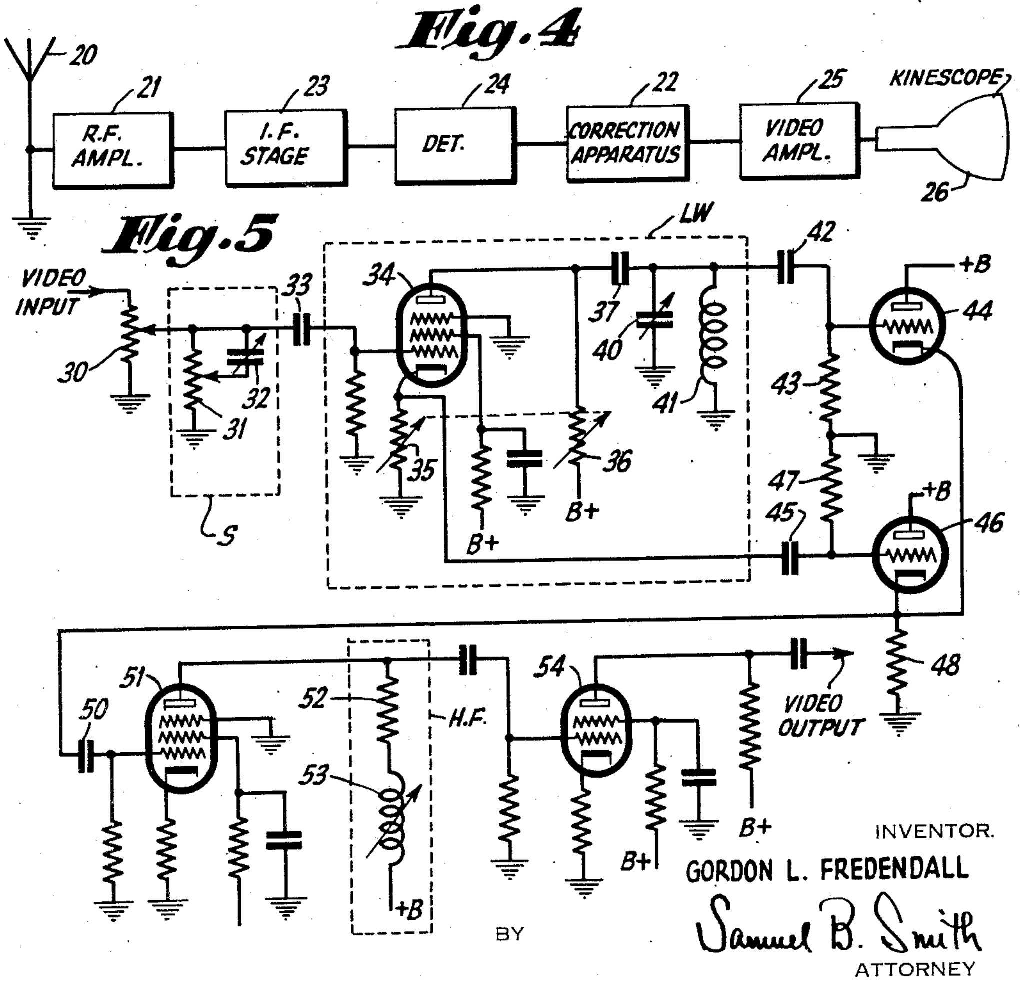
Fig. 4 is a schematic block diagram illustrating an alternative form of my invention.
Fig. 5 is a schematic circuit diagram for showing the circuits used for the compensation and minimizing of signal distortions in a television signal.

Referring to Fig. 4, there is shown a block diagram illustration of an alternative form of my invention and, in this illustration, the correction for distortion is made at the receiver rather than at the transmitter. Signals from a transmitter may be collected by an antenna 20 or received from well known transmitting means and it is assumed that these are uncorrected signals which have been phase distorted in the manner referred to hereinbefore in this specification. The signals are fed to RF amplifying means 21 and thence to IF amplifying means 23. The envelope of the signal at the output of amplifier 23 is detected by detector 24 and then applied to correction apparatus 22. The form of the correction apparatus comprising element 11 of Fig. 3 and element 22 of this figure will be illustrated in more detail hereinafter in Fig. 5.

The corrected or compensated output of the correction apparatus 22 is then passed to the video amplifier 25 and the corrected signals may be reproduced by the kinescope 26.

Referring to Fig. 5, there is shown a schematic circuit diagram illustrating an apparatus for compensating or correcting for phase and amplitude distortion in television signals. It will be assumed that the signal is one in which the white sections of the image are represented by the least signal and the dark sections of the image are represented by the greatest signal. Such a signal is impressed onto a potentiometer 30 and a portion of the signal is passed through a potentiometer having resistor 31 with condenser 32 shunted across at least a portion of the resistor. The combination of resistor 31 and condenser 32 forms the smear control and has been enclosed by a broken line box and will be referred to hereinafter as the circuit S.

Signals from this circuit are passed through coupling condenser 33 and impressed onto one grid of a multigrid tube 34. The cathode of tube 34 is grounded through a resistor 35 and the anode of the tube is connected to a source of positive biasing potential through resistor 36. Resistor 35 and resistor 36 are variable and are ganged together with common driving means to vary the value of the resistors. Resistors 35 and 36 are ganged in a fashion so that as the value of each of the resistors changes, substantially the same ratio is maintained between their respective values.

The anode of tube 34 also is connected through a blocking condenser 37 to a shunt circuit comprising variable condenser 40 and inductance 41. The circuit including tube 34, resistors 35 and 36, condenser 40 and inductance 41 has been enclosed by a broken line box and comprises the portion of the circuit which will control or compensate for the leading white component in the developed signal. This portion of the circuit will be referred to as the circuit LW and operates in effect as a frequency selective phase control circuit.

Signals from the shunt circuit including the elements 40 and 41 are impressed through coupling condenser 42 across resistor 43 and onto a grid of tube 44.

Signals from the cathode circuit of tube 34 are passed through coupling condenser 45 and impressed onto a control grid of tube 46 across the input resistor 47. The cathode of tube 46 is grounded through cathode resistor 48 and the cathode is tied directly to the cathode of tube 44. Output signals are taken off across cathode resistor 48 and are passed through coupling condenser 50 onto a control grid of thermionic tube 51.

The anode of tube 51 is connected to a source of positive energizing potential through serially connected resistor 52 and variable inductance 53. Resistor 52 and variable inductance 53 comprise the portions of the circuit which compensate for loss of high frequencies in the signal as brought out hereinbefore and have been enclosed in a box formed by a broken line and identified as the circuit HF.

The signals which have been altered by resistor 52 and inductance 53 are then amplified by tube 54 and are derived from an output circuit in the anode of the tube as indicated in the drawing. The operation of the circuit of Fig. 5 will be more closely understood by a reference to the curves of Figs. 6 through 10.

The video input signal is the signal as it is derived from the camera and no phase distortion due to the action of the transmitter or the vestigial side band filter has yet occurred. The greater distortion appears to take place from the action of the vestigial side band filter. A reference to Fig. 6 will show the general form of the signal developed when scanning the image of Fig. 1 and passing from the white section thereof into the black section. As pointed out hereinbefore, this signal should be rectangular in form, but, after distortion, the signal will have the appearance of the curve of Fig. 6. For ease in describing the character of the signal distortion represented in the waveform of Figure 6, it is convenient to think of the composite signal as being comprised of component signal frequencies falling into a low frequency component range, a medium frequency component range, and a high frequency component range. The signal value derived from the white portion of the image is assumed to have a level indicated by the level 60 of this figure. However, instead of increasing abruptly in value as the signal actually does when it is derived by the television camera, the signal will drop to a level 61 and this level represents an even whiter shade than that represented by the level 60. This has been identified in the curve as being the leading white component of the signal and is mostly attributable to phase distortion within the medium frequency component range of the signal.

Further, instead of the signal having a steep rectangular wave front, as it has when developed by the camera, the wave front slopes and then, with a series of oscillatory components, gradually assumes the level 62 representative of the black portions of the picture. The section of the signal in which these oscillations occur has been identified in the curve as the smear component and represents a virtual loss or attenuation of both medium and high frequency video signal components.

The slope of the curve, rather than its correct, more abrupt rise, indicates a further loss in some of the high frequency components which were present in the signal developed by the camera and this also has been identified and illustrated in the drawings of this curve.

Figure 6:
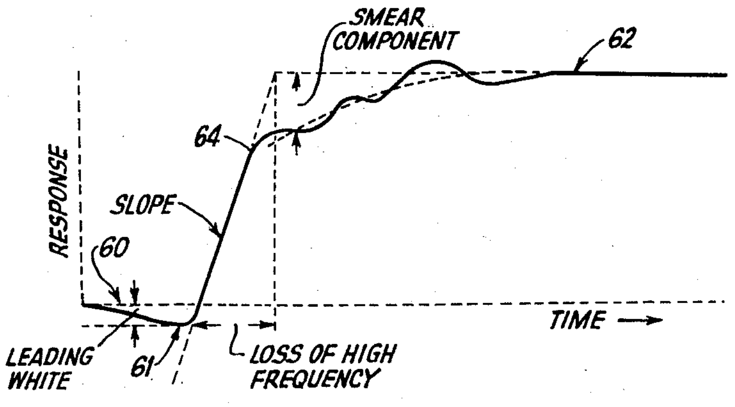
Figs. 6 through 10 are explanatory curves.
Figure 8:
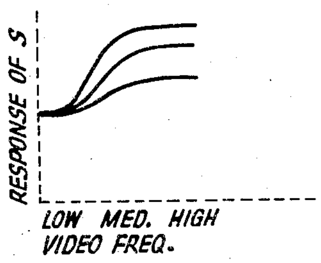

In order to compensate for the smear component, the gradual rise of the curve of Fig. 6 from the point 64 to the level 62 must be compensated so as to bring the point 64 up to the level of point 62 as rapidly as possible. This is accomplished by the circuit S comprising the resistor 31 with shunt condenser 32. This circuit has a frequency response such as indicated in Fig. 8, that is to say, the medium and higher video frequencies are accentuated. Since the smear component of the signals falls within the medium and high video frequency range, the level of the signal from the point 64 of Fig. 6 to the level 62 will be accentuated and hence raised relatively to the low frequency components of the signal represented by the signal at level 62.

Figure 7:
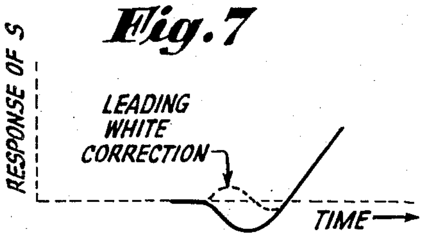

After the passage of the signal through the smear control circuit, it is impressed onto tube 34 with its associated cathode resistor 35 and load resistor 36. These two resistors are not concerned with frequency response but are concerned with the amplitude of the output signal from tube 34. It has been brought out hereinbefore that the ratio of the values of variable resistors 35 and 36 should remain constant throughout their range and this ratio should be substantially in the neighborhood of 1:2. The effect of this circuit will be to compensate for the leading white component by pre-distorting in phase some of the medium frequency components of the video signal. The leading white 61 is shown in Fig. 7 by the full line curve. After correction, the curve takes the form shown by the dotted curve. On the reproducing screen, the light variation corresponding to the part of the dotted curve above the axis tend to average to zero at the normal viewing distance for a television picture.

Figure 9:
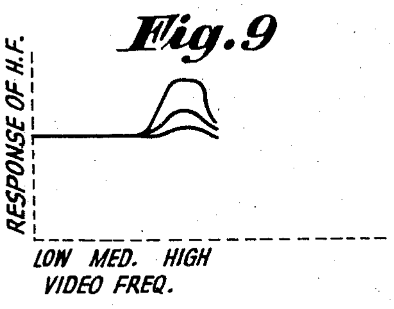

The signal which thus has been pre-distorted in phase by the action of circuit S and the arrangement of circuit LW then is passed by appropriate coupling circuits to vacuum tube 51 which has, in the output circuit thereof, resistor 52 and variable inductance 53. This circuit has been identified as the circuit HF and it is this circuit which compensates for the loss of high frequency components in the video signal as represented by the slope of the normally rectangular wave as illustrated in Fig. 6. The circuit HF is a circuit which has a characteristic such that it accentuates only the high frequency components of the video signal and its frequency response curve is illustrated in Fig. 9. The action of this circuit will be such then that the slope of the video signal normally developed by the camera will be changed so that, after distortion takes place, the slope will be steeper than if no pre-distorting had occurred.

Figure 10:
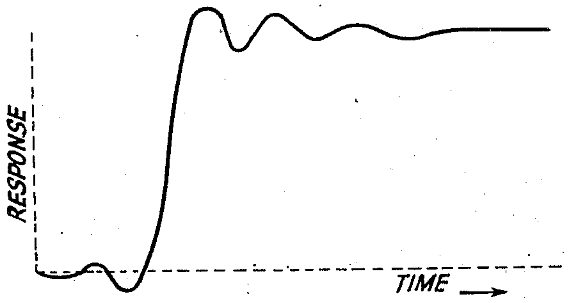

The over-all effect of the circuits S, LW, and HF is illustrated in Fig. 10 which illustrates a signal which has been corrected by these networks and then has been subjected to the distorting influences of the transmitter and the vestigial side band filter. The leading white correction has smoothed out the severe tip which is ahead of the rectangular portion of the curve and the wave front slope has been heightened. The smear component has been brought up to a level comparable with the black level.

In summary then, it can be seen that in television transmitting systems employing vestigial side band transmission, the present invention serves to minimize the effects of video signal distortion resulting from transmitter system operation. The smear distortion component is corrected by effecting appropriate medium and high frequency boost to the video signal. The leading white distortion component is in turn compensated by suitable phase shifting of medium frequency components. Finally, the high frequency distortion component is alleviated through the additional boost or accentuation of appropriate high frequency component.

It will be appreciated that the correction could take place at the receiver by utilizing the same type of circuits and this has been illustrated schematically in Fig. 4.

It is further appreciated that the correcting means may correct for the wave form distortion due to the circuits of the receiver and the transmitter simultaneously.

Having thus described the invention, what is claimed and desired to be secured by Letters Patent is the following:

1. In a radio frequency television transmission and reception system utilizing a radio frequency carrier amplitude modulated by a video signal, said video signal comprising a low frequency component, a medium frequency component, and a high frequency component, said system further employing a vestigial side band filter for suppression of at least a portion of one modulation side band and wherein said vestigial filter inherently introduces frequency selective phase and amplitude distortion in the modulated carrier, thereby tending to produce in the video signal demodulated from the carrier leading white phase distortion of medium frequency video signal components, smear amplitude distortion of both medium and high frequency components of video signal said smear distortion representing equal attenuation of both medium and high frequency video signal components, and high frequency distortion resulting from additional attenuation of high frequency components, a distortion-compensatory system comprising, a single signal corrective device having input terminals and output terminals, said corrective device comprising in combination, a leading white correction section comprising a frequency selective phase shifting apparatus for communicating medium frequency video signal components and having phase shifting characteristics opposed to the leading white phase distortion produced by said vestigial filter, a smear correcting section comprising a filter means for effecting substantially equal accentuation of video signal medium and high frequency components, and a high frequency correcting section comprising filter means for providing additional accentuation of only high frequency video signal components, said leading white correcting section, said smear correcting section and said high frequency correcting section being connected in cascade between said input and said output terminals and connection placing said correcting device in cascade with those sections of said television system handling video signal whereby the video signal extracted from the carrier modulation envelope is substantially freed from evidence of vestigial filter distortion.

2. Apparatus according to claim 1 wherein said leading white correction section comprises a signal communicating arrangement having an input circuit and two output circuits such that push-pull signals are developed in said output circuits by signals applied to said input circuit, and wherein said smear correcting section comprises the parallel combination of a resistance and a capacitance placed in shunt with circuit terminals across which video signal energy appears, a tuned circuit resonant to a medium frequency component of the video signal, said resonant circuit being connected with at least one of said output circuits, means for subtractively combining the output signals developed by said signal communicating arrangement output circuits, and said high frequency correcting circuit comprising an inductance placed in shunt with the output of said subtractive means.

GORDON L. FREDENDALL.

REFERENCES CITED

The following references are of record in the file of this patent:

UNITED STATES PATENTS

| Number | Name | Date |
|---|---|---|
| 1,921,022 | Burton | Aug. 8, 1933 |
| 2,029,523 | Curtis | Feb. 4, 1936 |
| 2,058,883 | Ives | Oct. 27, 1936 |
| 2,101,832 | Barton | Dec. 14, 1937 |
| 2,176,587 | Goldstine | Oct. 17, 1939 |
| 2,206,638 | Koch | July 2, 1940 |
| 2,263,376 | Blumlein et al. | Nov. 18, 1941 |
| 2,298,930 | Decino | Oct. 13, 1942 |
| 2,299,875 | Bedford | Oct. 27, 1942 |
| 2,378,797 | Schade | June 19, 1945 |
| 2,385,563 | Beers | Sept. 25, 1945 |
| 2,438,217 | Johnson | Mar. 23, 1948 |